(12) United States Patent
Chao et al.

(10) Patent No.: US 11,201,665 B2
(45) Date of Patent: Dec. 14, 2021

(54) METHOD TO INTEGRATE BLOCKCHAIN AND GEOGRAPHIC INFORMATION IN DISTRIBUTED COMMUNICATION

(71) Applicant: Purdue Research Foundation, West Lafayette, IN (US)

(72) Inventors: Hsun Chao, West Lafayette, IN (US); Apoorv Maheshwari, West Lafayette, IN (US); Daniel DeLaurentis, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 89 days.

(21) Appl. No.: 16/840,385

(22) Filed: Apr. 4, 2020

(65) Prior Publication Data
US 2020/0322041 A1 Oct. 8, 2020

Related U.S. Application Data

(60) Provisional application No. 62/829,188, filed on Apr. 4, 2019.

(51) Int. Cl.
*H04B 7/185* (2006.01)
*H04W 12/04* (2021.01)
(Continued)

(52) U.S. Cl.
CPC .......... *H04B 7/18506* (2013.01); *H04W 4/80* (2018.02); *H04W 12/04* (2013.01); *H04W 12/06* (2013.01)

(58) Field of Classification Search
CPC ....... H04W 12/06; H04W 12/04; H04W 4/80; H04W 12/106; H04W 4/44; H04B 7/18506; H04L 9/3239; H04L 2209/38
See application file for complete search history.

(56) References Cited

U.S. PATENT DOCUMENTS

| | | | |
|---|---|---|---|
| 2017/0242431 A1* | 8/2017 | Dowlatkhah | G08G 5/0069 |
| 2019/0238338 A1* | 8/2019 | O'Brien | G08G 5/0008 |
| 2020/0043007 A1* | 2/2020 | Simons | G06Q 20/08 |

OTHER PUBLICATIONS

M. Degarmo et al., "Prospective Unmanned Aerial Vehicle Operations in the Future National Airspace System," AIAA 4th Aviat. Technol. Integr. Oper. Forum, No. September, pp. 1-8, Sep. 2004.
(Continued)

*Primary Examiner* — Brandon J Miller
(74) *Attorney, Agent, or Firm* — Piroozi-IP, LLC

(57) ABSTRACT

A blockchain-based distributed network is disclosed which includes a plurality of moveable devices coupled to each other by a shortrange wireless channel, one or more ground systems coupled to the shortrange wireless channel, and one or more data centers coupled to the one or more ground systems via a long-range channel, each of the devices coupled to the shortrange wireless channel including an onboard system adapted to i) receive one or more blockchains; ii) verify authenticity of the one or more blockchains; iii) update data based on the verified one or more blockchains; iv) select one of the one or more blockchains; v) append a new block to last block of the selected blockchain; and vi) broadcast the appended blockchain, the one or more ground systems adapted to relay information from and to the plurality of moveable devices to and from the one or more data centers.

20 Claims, 17 Drawing Sheets

(51) Int. Cl.
*H04W 12/06* (2021.01)
*H04W 4/80* (2018.01)

(56) References Cited

OTHER PUBLICATIONS

M. Narkus-Kramer, "Future Demand and Benefits for Small Unmanned Aerial Systems (UAS) Package Delivery," 17th AIAA Aviat. Technol. Integr. Oper. Conf., No. June, pp. 1-7, 2017.
J. Corning et al., "FAA Aerospace Forecast Fiscal Years 2018-2038," Washington D.C., 2018.
G. Fasano et al., "Multi-Sensor-Based Fully Autonomous Non-Cooperative Collision Avoidance System for Unmanned Air Vehicles," J. Aerosp. Comput. Information, Commun., vol. 5, No. 10, pp. 338-360, Oct. 2008.
D. Alejo et al., "Multi-UAV collision avoidance with separation assurance under uncertainties," in IEEE 2009 International Conference on Mechatronics, ICM 2009, 2009, pp. 1-6.
R. Carnie et al., "Image processing algorithms for UAV 'sense and avoid,'" in Proceedings—IEEE International Conference on Robotics and Automation, 2006, vol. 2006, pp. 2848-2853.
C. Le Tallec et al., "Low Level RPAS Traffic Management (LLRTM) Concept of Operation," 17th AIAA Aviat. Technol. Integr. Oper. Conf., No. June, pp. 1-16, 2017.
D. Federal Aviation Administration (FAA), "Federal Register: Automatic Dependent Surveillance-Broadcast (ADS-B) Out Performance Requirements to Support Air Traffic Control (ATC) Service," 2010.
D. McCallie et al., "Security analysis of the ADS-B implementation in the next generation air transportation system," Int. J. Crit. Infrastruct. Prot., vol. 4, No. 2, pp. 78-87, Aug. 2011.
A. Costin et al., "Ghost in the Air(Traffic): On insecurity of ADS-B protocol and practical attacks on ADS-B devices," Black Hat USA, pp. 1-10, 2012.
R. ARC Recommendations, "UAS Identification and Tracking (UAS ID) Aviation Rulemaking Committee (ARC) ARC Recommendations Final Report," Washinton D.C., 2017.
H. Okcu, "Operational Requirements of Unmanned Aircraft Systems Data Link and Communication Systems," J. Adv. Comput. Networks, vol. 4, No. 1, pp. 28-32, 2016.
M. Pilkington, "Blockchain Technology: Principles and Applications," Res. Handb. Digit. Transform., pp. 1-39, 2015.
A. Wright et al., "Decentralized Blockchain Technology and the Rise of Lex Cryptographia," SSRN Electron. J., Mar. 2015.
A. Mour et al., "Agent-Based Modeling for Systems of Systems," INCOSE Int. Symp., vol. 23, No. 1991, p. 15, Jun. 2013.
H. Chao et al., "UAV Traffic Information Exchange Network," in 2018 Aviation Technology, Integration, and Operations Conference, exact 2018 date unknown.
Chao et al., Exact Date unknown, A Practical Solution to the Federal Aviation Administration's Proposed Remote ID Regulations. School of Aeronautics and Astronautics—Purdue University.
Andrieu et al., (2010). Particle Markov chain Monte Carlo methods. Journal of the Royal Statistical Society: Series B (Statistical Methodology), 72(3), 269-342.
Popov, S. (2018). The Tangle.
Popov et al., exact 2019 date unknown. Equilibria in the tangle. Computers and Industrial Engineering, 136, 160-172.
Kusmierz et al., Properties of the Tangle for Uniform Random and Random Walk Tip Selection. Proceedings—2019 2nd IEEE International Conference on Blockchain, Blockchain 2019, 228-236, exact 2019 date unknown.

* cited by examiner

FIG. 9

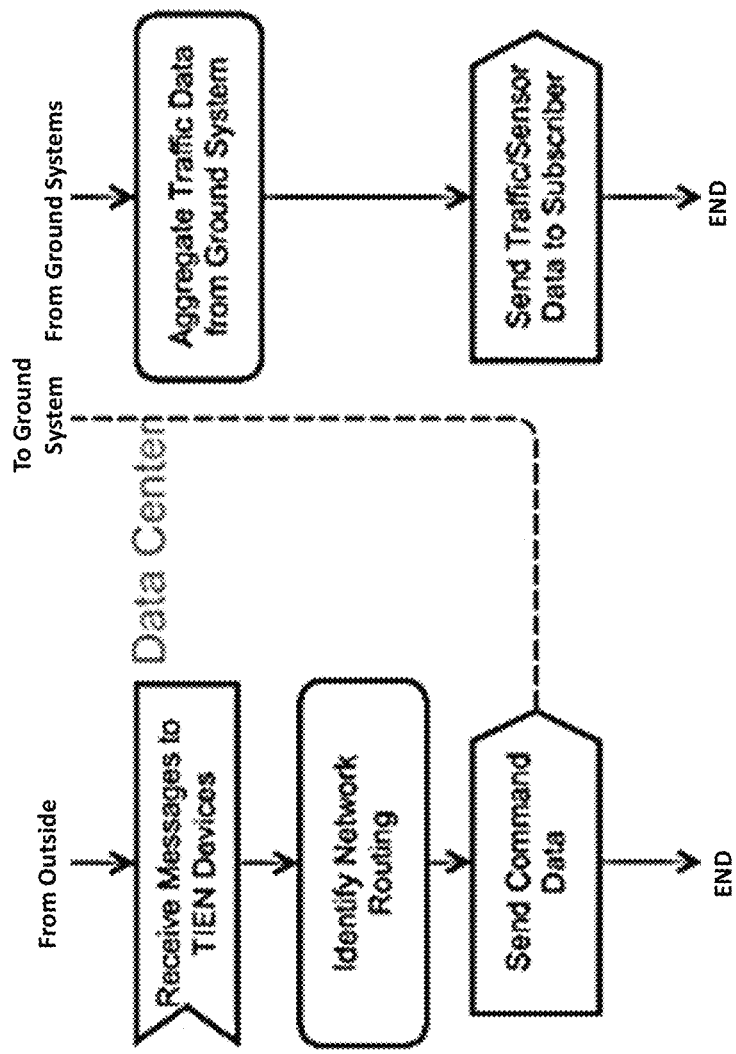
FIG. 11, Cont'd

METHOD TO INTEGRATE BLOCKCHAIN AND GEOGRAPHIC INFORMATION IN DISTRIBUTED COMMUNICATION

CROSS-REFERENCE TO RELATED APPLICATIONS

The present patent application is related to and claims the priority benefit of U.S. Provisional Patent Application Ser. No. 62/829,188 filed 4 Apr. 2019, the contents of which are hereby incorporated by reference in its entirety into the present disclosure.

STATEMENT REGARDING GOVERNMENT FUNDING

This technology associated with the present disclosure was not made with government support.

TECHNICAL FIELD

The present disclosure generally relates to unmanned aerial vehicle (UAV) air traffic control, and in particular, to application of blockchain to the same.

BACKGROUND

This section introduces aspects that may help facilitate a better understanding of the disclosure. Accordingly, these statements are to be read in this light and are not to be understood as admissions about what is or is not prior art.

The number of Unmanned Aerial Vehicles (UAVs) is expected to grow in the near future owing to its potential capabilities to provide agile and flexible services such as package delivery, terrain surveillance, etc. According to one estimate, eighty-eight billion small UAVs will operate under an altitude of 500 feet in Washington D.C. metropolitan area in 2050 with a significant amount of social economic benefits. Another estimation by Federal Aviation Administration (FAA) forecasts 2.4 million units of small hobbyist UAVs, four hundred fifty thousand of small commercial UAVs, and three hundred thousand of licensed remote pilot's by 2022 in the United States. However, the presence of obstacles (e.g., tall buildings) in metropolitan area renders the monitoring of UAV operations difficult by blocking line of sight for radar and other surveillance systems. Consequently, ensuring airspace safety during the future high-density UAV operations in an urban setting poses an urgent challenge.

Several solutions to these challenges have been discussed in the prior art. A popular research areas related to ensuring air space safety with autonomous UAV operations include developing UAV Detect-And-Avoidance (DAA) systems and UAV related policy. Exemplary approaches includes DAA mechanism for various types of UAVs, however, in such approaches true location of other vehicles are assumed to be error-free and available via other systems, which may not be available, particularly in high-density urban areas with high concentrations of tall buildings resulting in momentary loss of position data as a result of loss of line-of-sight. Others have developed vision-based obstacles and vehicles detection system, but performances of this system will be downgraded in metropolitan areas due to the high density of obstacles. In yet other approaches, distributed radar systems deployment have been proposed with cellular network in the city to enhance the air traffic surveillance and communication capabilities. However, the associated costs for both equipment and land for the deployment would drive up the system deployment difficulties, especially in the early stage of the drone-based service development.

In yet another approach presented in the prior art, an Automatic Dependent Surveillance Broadcast (ADS-B) appears to be the most prominent traffic surveillance and data sharing system for aircraft operations, which is potentially capable for UAV application. However, many experts have expressed concerns about ADS-B security due to lack of message encryptions and message digital signatures. Others have shown that ADS-B is vulnerable under several types of cyber-security attack, such as data jamming, message tampering, etc.

Therefore, there is an unmet need for a novel and efficient traffic data surveilling system and method for a drone-based service while ensuring the airspace safety for high density UAV operations that is resilient to cybersecurity concerns. Such a system must be capable of 1) economical data distribution; 2) secure data transmission against cyber-attacks with low technological requirements; 3) high refresh rate for on-time information for detect-and-avoid systems to ensure vehicle clearances; 4) ability to deliver information amidst larger number of obstacles to ensure air space safety in metropolitan areas; 5) ad-hoc network allowing UAVs to be able to join in or leave the system without impacting overall performance; and compatibility—in order to provide traffic information for other collision avoidance systems.

SUMMARY

A blockchain-based distributed network is disclosed. The network includes a plurality of moveable devices coupled to each other by a shortrange wireless channel. The network further includes one or more ground systems coupled to the shortrange wireless channel in the distributed network. The network further includes one or more data centers coupled to the one or more ground systems via a long-range channel. Each of the plurality of the moveable devices includes an onboard system adapted to i) receive one or more blockchains from the shortrange wireless channel; ii) verify authenticity of the one or more blockchains; iii) update data based on the verified one or more blockchains; iv) select one of the one or more blockchains; v) append a new block to last block of the selected blockchain, wherein the new block contains the updated data; and vi) broadcast the appended blockchain. The one or more ground systems adapted to relay information from and to the plurality of moveable devices to and from the one or more data centers.

BRIEF DESCRIPTION OF DRAWINGS

FIG. 3b is a logic layer for the header shown in FIG. 3a.

FIG. 9 is a schematic diagram of the layout of a virtual world in a simulation of the system of the present disclosure.

DETAILED DESCRIPTION

Figure 1:
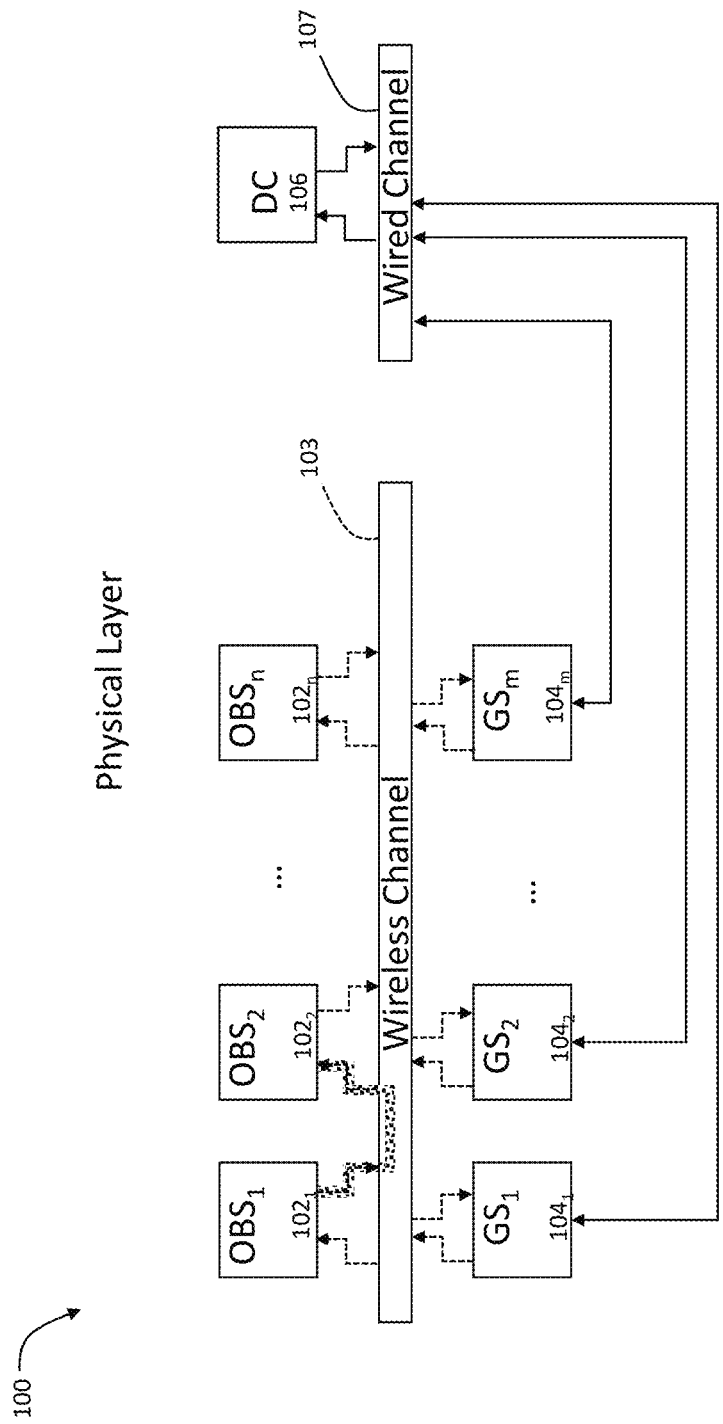
FIG. 1 is a schematic representation of a physical layer of a system, according to the present disclosure, including onboard systems, ground systems, and a data center.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The present disclosure describes a novel communication protocol based on blockchain implantation that is built on a location-based (i.e., geographical) layer. While the present disclosure has been discussed with respect to unmanned aerial vehicle (UAV) traffic, no such limitation is intended. Thus, the system and methods of the present disclosure are intended to apply to any distributed network of devices that need to communicate with each other and to a central system for surveilling and data sharing. In such a network, according to the present disclosure, there are moveable devices as well as stationary devices in relatively close proximity to the moveable device in addition to central remote data centers. The moveable devices are coupled to each other and to the stationary devices via shortrange wireless communication channels. The stationary and the remote data centers are coupled to each other via long-range communication channels, including wired or wireless channels. The system of the present disclosure is thus referred to herein as the Traffic Information Exchange Network (TIEN), According to one embodiment, the TIEN system can be used for UAV operations in metropolitan areas. However, it is to be understood and appreciated that the TIEN system can be applied to other systems such as distributed ride sharing, ground-based drone systems, and a host of other networks.

In its implementation with respect to UAVs, the TIEN system is a novel and efficient traffic data surveilling for a drone-based service while ensuring the airspace safety for high density UAV operations that is resilient to cybersecurity concerns which is robust against signal blocking by obstacles.

Referring to FIG. 1, a schematic representation of a physical layer of a TIEN system 100 according to the present disclosure is provided. The TIEN system 100 includes a plurality of UAVs each with an onboard system (OBS) $102_i$. Shown in FIG. 1 are OBSs $102_1$, $102_2$, ... $102_n$. The OBSs $102_i$ are coupled to each other via a wireless channel 103. The wireless connection is based on a short range radio frequency (RF) communication protocol, e.g., a wide-area network (WAN), and in particular, a low-power WAN (LP-WAN), or other networks and associated protocols known to a person having ordinary skill in the art. Several platforms are known in LPWAN. These include DASH7, Sigfox, LoRa, chirp spread spectrum, weightless, Wize, and other protocols known to a person having ordinary skill in the art.

In addition to the OSBs $102_i$, the TIEN system 100 includes ground systems (GS) $104_i$. Shown in FIG. 1 are GSs $104_1$, $104_2$, ... $104_m$. These GSs $104_i$ behave similarly as the OBSs $102_i$ in that they are also coupled to the OBSs $102_i$ via the wireless channel 103, where they behave as another OBS $102_i$, however, they are different than OBSs $102_i$ as they are also coupled to one or more data centers (DC) 106 (only one is shown) via a long range channel (e.g., a wired channel 107), but where other wireless long-range communication are also possible such as cellular communication. While wireless and wired terminologies are used, it should be appreciated that by "wireless channel", the present disclosure intends a wireless channel base on a relatively short range (e.g., 10 meters to 7000 meters). Conversely, by "wired channel", the present disclosure intends a channel that has a far reach. Such a channel can be wired, cellular, or other long-range communication approaches. DCs 106 collect and integrate data from GSs $104_i$ and share with any interested subscribers, such as Federal Aviation Administration, aircraft controllers, UAV operators, etc. GSs $104_i$ are the interface to build connections from DCs 106 on the ground to any onboard systems in the air. Ground systems collect the wireless data and share them with data centers via the wired communication channel 107. Additionally, GSs $104_i$ accept commands and requests from data centers and forward them to the OBSs $102_i$ thereby establishing bidirectional communications.

It should be appreciated that the accumulative number of OBSs and GSs that are within the range of the shortrange wireless communication establish a minimum number of blockchains in that distributed network. For example, if there are 100 OBSs and 50 GSs within the aforementioned range, the minimum number of blockchains is 150.

DCs 106 collect data from GSs 104 across a city and merge them into a global traffic operating picture. They also share the global traffic operating pictures with any interested subscribers, such as air traffic controllers, UAV operators, local residents, or other UAV-related databases. DCs 106 can also accept commands or requests from governmental sectors or operators to provide a communication path to certain OBSs 102. This mechanism grants the ability to governmental sectors to broadcast any emergent notification to vehicles in certain areas in cities. In FIG. 1, wireless connections are shown in dashed lines and wire connections are shown in solid lines.

The OBSs $102_i$ are adapted to communicated with each other via the wireless channel 103 or with the GSs $104_i$ via the wireless channel 103. In communicating with each other, the OBSs $102_i$ are adapted to communicate traffic and obstacle data directly to each other. This communication capability is shown in a shaded fashion in FIG. 1. On the other hand, the same information is also available to GSs $104_i$ which can relay the information to the DC 106 for communication to systems outside of the TIEN system 100.

Figure 2:
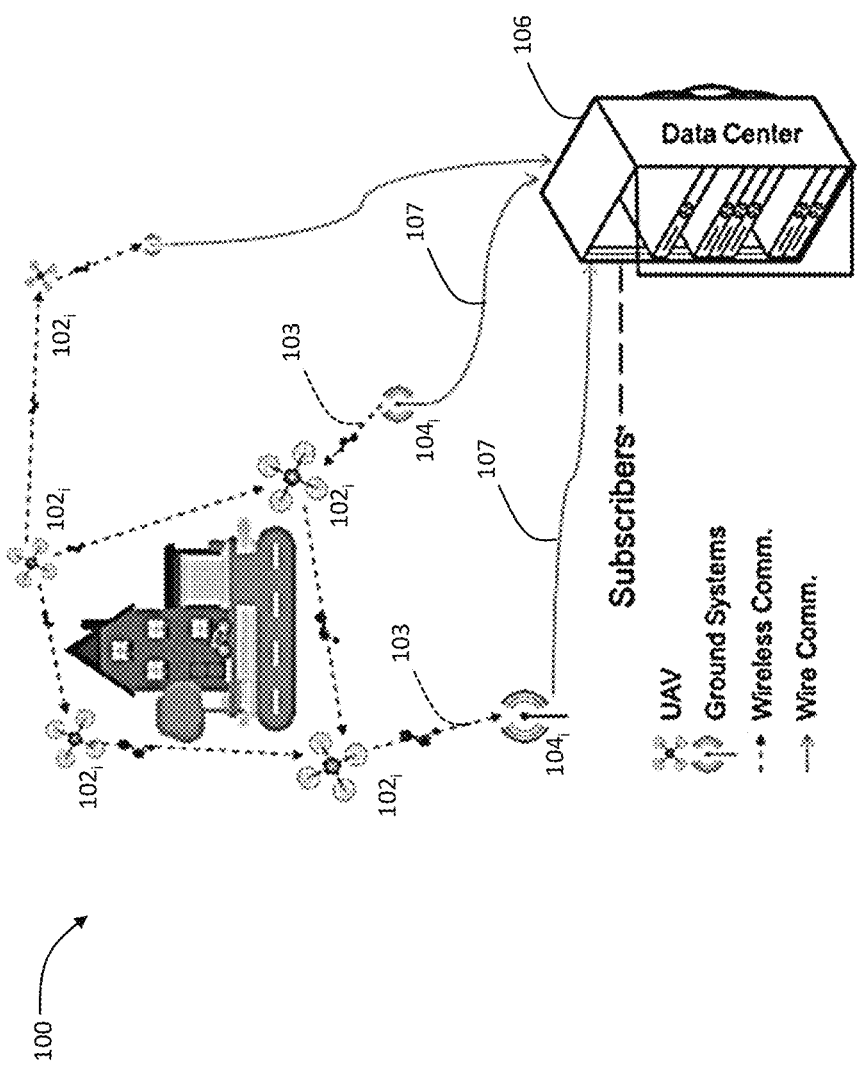
FIG. 2 is another schematic of how the components of the system shown in FIG. 1 are disposed with respect to one another, according to the present disclosure.

Referring to FIG. 2, another schematic of how the components of the TIEN system 100 shown in FIG. 1 are disposed with respect to one another, according to the present disclosure. As shown in FIG. 1, there are a plurality of OBSs $102_i$, coupled to each other and further coupled to GSs $104_i$ via the wireless channel 103. The GSs $104_i$ are coupled to the DC 106 via the wired channel 107.

Figure 3A:
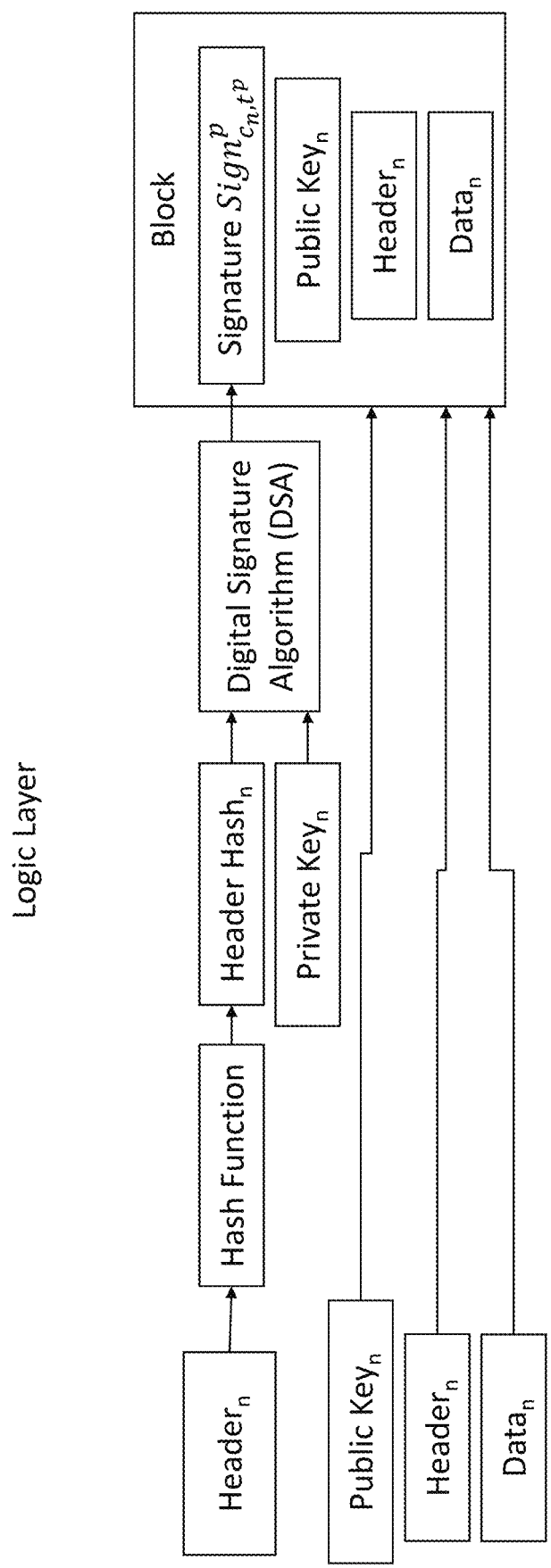
FIG. 3a is a block diagram showing a logic layer of the system of FIG. 1.
Figure 3B:
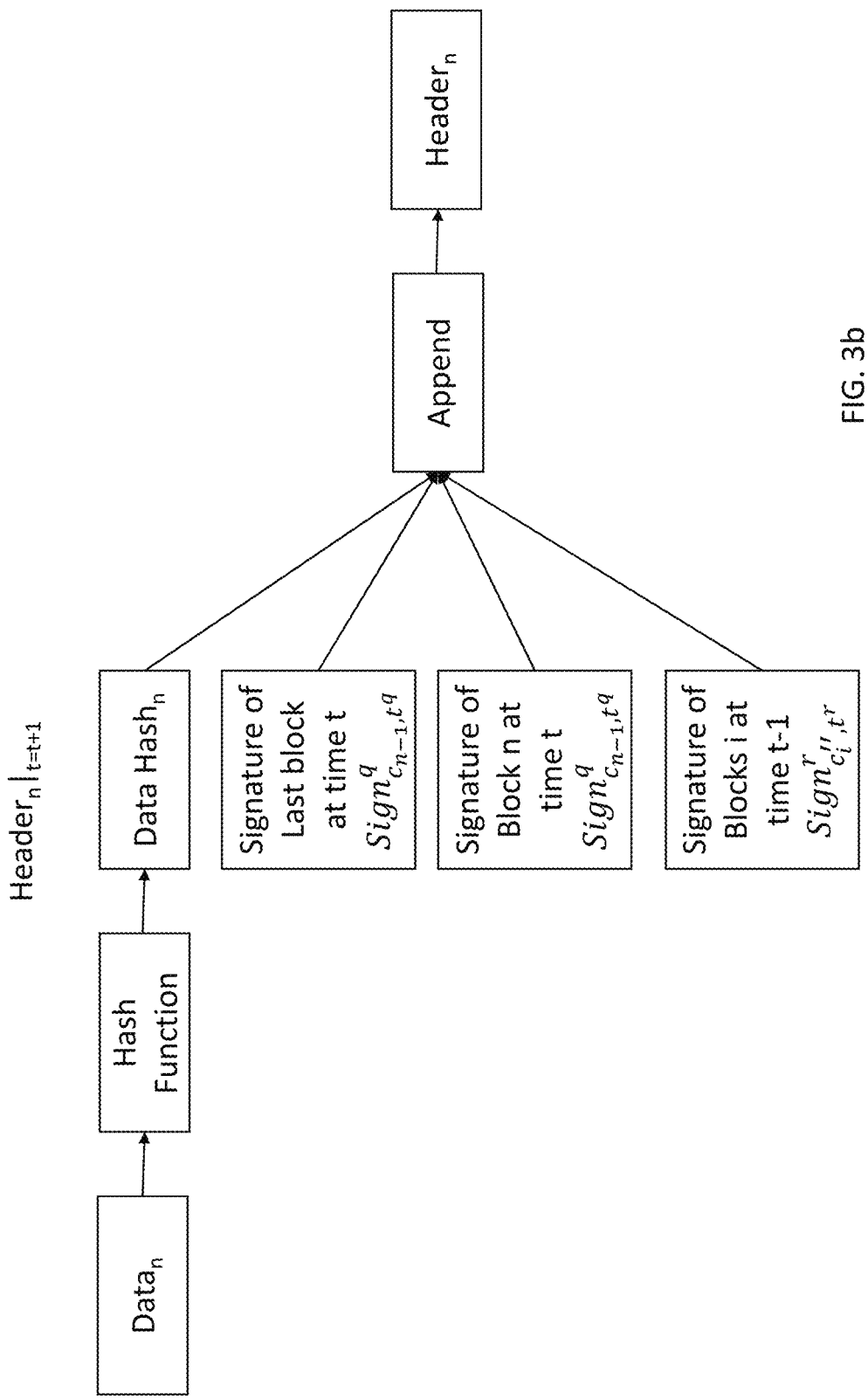

Referring to FIG. 3a, a block diagram showing the logic layer is provided. In the logic layer, a header is first constructed. Referring to FIG. 3b, a logic layer for the header is shown. The header includes a data hash which is data associated with a UAV, e.g., altitude, velocity (vector-based data), and other UAV-based data such as health status, etc. at time t+1, that has passed through a hash function. The data is identified in FIG. 3b as $Data_n$ for $UAV_n$ (again at time t+1). The data hash (i.e., Data $Hash_n$) is appended to three other fields. These include: 1) signature of the last block in the blockchain (signature is obtained when the Header $Hash_n$, i.e., the output of a hash function when the input is the $Header_n$ is passed through a digital signature algorithm (DSA) along with a Private $Key_n$ for the $OBS_n$) at time t; 2) signature of the $OBS_n$ (i.e., the instant OBS) from the prior timestamp (i.e., time t); and 3) signature of other blocks i at time t. These 4 components are appended to yield the header.

It should be appreciated that when a blockchain is initially being formed, it lack information from prior times for itself and other blocks. Therefore, the fields number 2 and 3 are not known. In that case, a predetermined genesis field can be used to populate these fields, as is known by a person having ordinary skill in the art.

Returning to FIG. 3a, as already discussed the $Header_n$ is passed through the hash function to yield the Header $Hash_n$. It should be appreciated that the hash function for the header should be the same for all OBSs and GSs. In addition, the hash function for the data should be the same for all the OBSs and GSs. However, the hash function for data and header can be different or the same. This Header Hashn is then passed through the DSA, as discussed above, along with the Private $Key_n$ to yield the signature of the block ($Sign_{c_n,t}P$). Other components are then appended to makeup the block that is to be added to the blockchain. These components include Public $Key_n$ for the $OBS_n$, the $Header_n$ (described with respect to FIG. 3b), and $Data_n$. The completed bitstream represents a block that can be added to the blockchain.

Figure 3C:
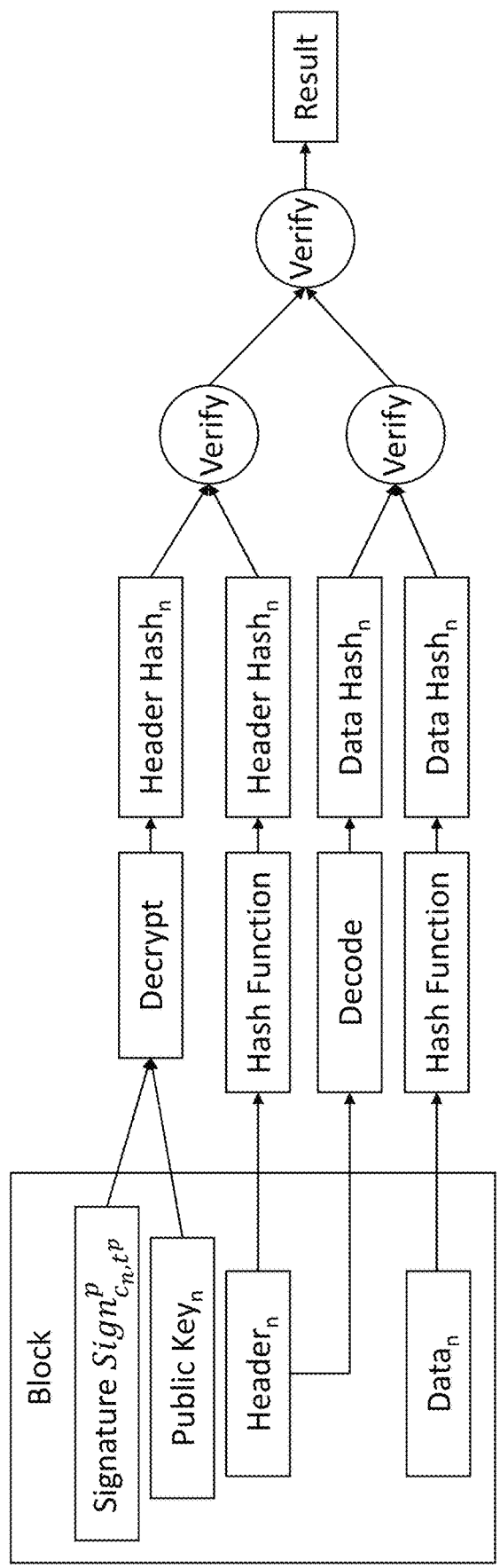
FIG. 3c is a schematic of steps in verification of authenticity of blocks in the blockchain, according to the present disclosure.

When an $OBS_n$ or a $GS_n$ first receives blockchain, the information from the last block can be extracted and verified. The verification process is shown in FIG. 3c. Once a blockchain is received the block is extracted. The block was last placed onto the blockchain by another OBS. Here the subscript n is used to point to that block. The verification process first looks at the signature of that OBS and decrypts the $Signature_n$ along with the Public $Key_n$ and thereby extracts the Header $Hash_n$ of $OBS_n$. Next, the verification procedure applies the hash function to the $Header_n$ accompanied in the block to obtain the Header $Hash_n$. These two copies of the Header $Hash_n$ are compared and verified to be the same. According to one embodiment, a positive result from this verification is deemed sufficient to consider the block to be genuine and tamper-free. According to another embodiment, the $Header_n$ accompanied with the block is decoded to yield the Data $Hash_n$ ($Header_n$ includes Data $Hash_n$ as part of its bitstream, see FIG. 3b). The verification procedure then according to this embodiment, passes the $Data_n$ which is accompanied as part of the block through the hash function to obtain another copy of the Data $Hash_n$. These two copies of the Data $Hash_n$ are compared and verified to be the same. The verification of the Header $Hash_n$, described above, and the Data $Hash_n$ are combined to provide a more robust verification, according to this embodiment.

Figure 3D:
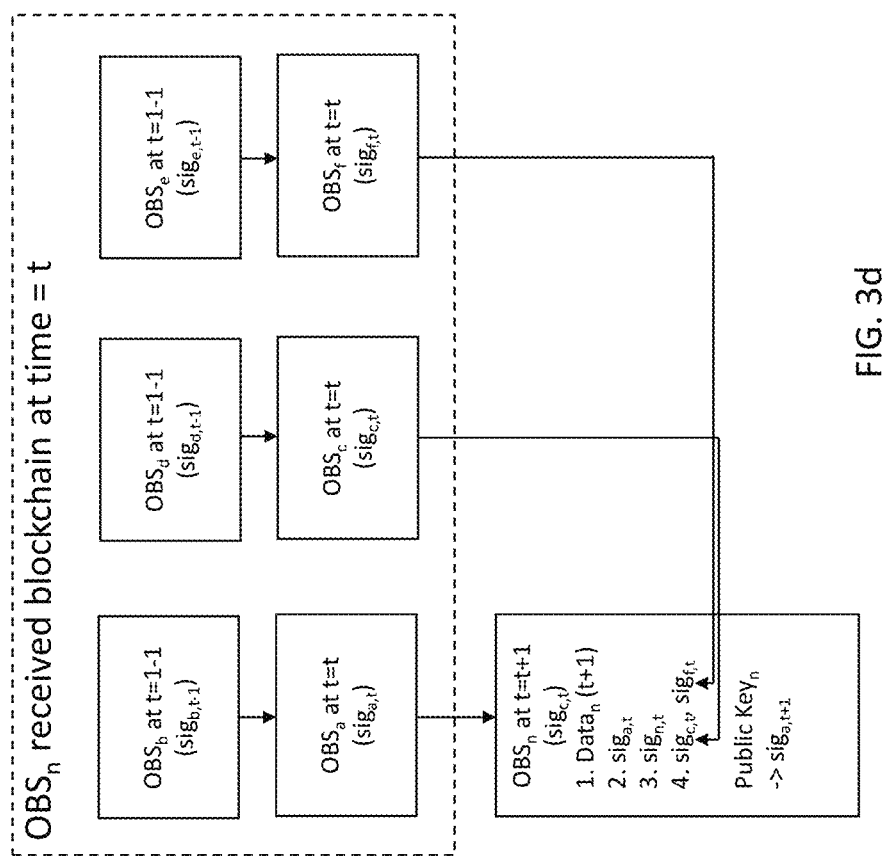
FIG. 3d is a schematic of timing progression of six onboard systems (a-f) forming six blockchains at times t=t−1 and t=t, and how at time t=t+1, an onboard systems chooses one of the blockchains from a timing perspective.

Referring to FIG. 3d, a schematic of timing progression of six onboard systems (a-f) forming six blockchains at times t=t−1 and t=t is shown. At time t=t+1, an onboard systems chooses one of the blockchains from a timing perspective. This schematic is intended to show how timing progresses. Time periods between timeslots t−1, t, and t+1 are arbitrary; that is suppose there was a global clock with a period defining these timeslots. Between t−1 and t, according to FIG. 3d, three OBSs ($OBS_a$, $OBS_c$, and $OBS_f$), would have broadcasted their blocks. For example during this period (for understanding only, let the period be T), suppose $OBS_a$, $OBS_c$, and $OBS_f$ would have broadcasted their blocks at 0.1 T, 0.5 T, and 0.9 T, this all of these OBSs would have broadcasted their individual blocks during time t−1 and t. If $OBS_n$ chooses to select $OBS_a$, then the second item in the header would have been the signature of the $OBS_a$ at time t and the third item in the header would have been the self-signature of $OBS_n$ at time t. The fourth item may be the signatures of $OBS_c$ and $OBS_f$ at time t.

Figure 4:
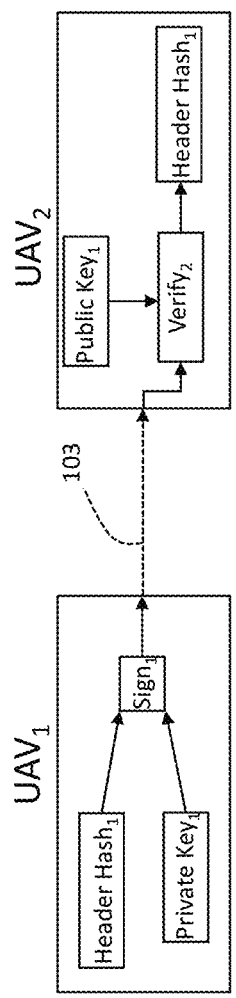
FIG. 4 is a block diagram of an exemplary encryption/decryption methodology of the present disclosure.

An exemplary encryption/decryption methodology of the present disclosure is shown in FIG. 4. $UAV_1$ encrypts its header hash (Header $Hash_1$) with its private key (Private $Key_1$) and placed the encrypted block (not shown) as part of the blockchain onto the wireless channel 103. $UAV_2$ receives the encrypted header hash and using a public key (Public Key) decrypts the encrypted header hash.

In the TIEN system 100, a block is the basic unit to store the traffic data. As discussed above, a block includes four parts, which are a header, data content, a public key, and a block signature. The data content includes the unencrypted vehicle status and the encrypted communication data. The unencrypted vehicle status is the public information for every participant to create a local traffic operating picture. The unencrypted vehicle status includes at least but not limited to the state of a vehicle and a time stamp about when the data are rendered. The encrypted communication data are the optional and private information between two participants. Only the specific participants have the authority to decrypt the data. As discussed, a TIEN system OBS $102_i$ or GS $104_i$ device generates a data hash based on encrypted and unencrypted data in the data content. The data hash is stored in the block header. And, the header structure is discussed in the following section. The TIEN device uses a digital signature algorithm to create a block signature based on the header and a private key. A public key, which can verify the digital block signature, is included in the block.

The header is the input for a digital signature algorithm to generate a block signature. Additionally, block signatures are pointers and describe how blocks are connected in blockchains and Directed Acyclic Graph (DAGs), as discussed below. Thus, in totality a header includes:

1) A data hash, which is generated based on the data content in a block;
2) A block signature of the last block on a blockchain;

3) A block signature of the latest block the TIEN device generated; and

4) Block signatures of blocks from the "neighboring" devices.

In general, a data hash is a pointer to the data. While, a data hash connects the header with the block data content, the block signature of the last block on a blockchain connects blocks together to form the blockchain. The block signature of the latest block a TIEN system 100 generated provides a link between the current status of a device to its history, while the block signatures of blocks from the "neighboring" devices reveal the status of the communication network topology to others. The "neighboring" devices are the devices which sent blockchains to the receiver device within a few broadcasting periods. A neighbor is defined as a device that is within the shortrange communication distance of another device. Thus a moveable device (e.g., a UAV and its onboard system) is a neighbor of another moveable device or a stationary device (e.g., a ground system) if they can communicate via the shortrange communication channel. These concepts are further defined with respect to FIG. 7, discussed below. It should be appreciated that ground systems $104_i$ can be stationary, or moveable. In case they are stationary, the can be coupled to the data centers via a long-range wired or wireless communication arrangement. If, they are moveable, then can only be coupled to the data centers via a wireless long-range communication arrangement such as cellular.

Figure 5:
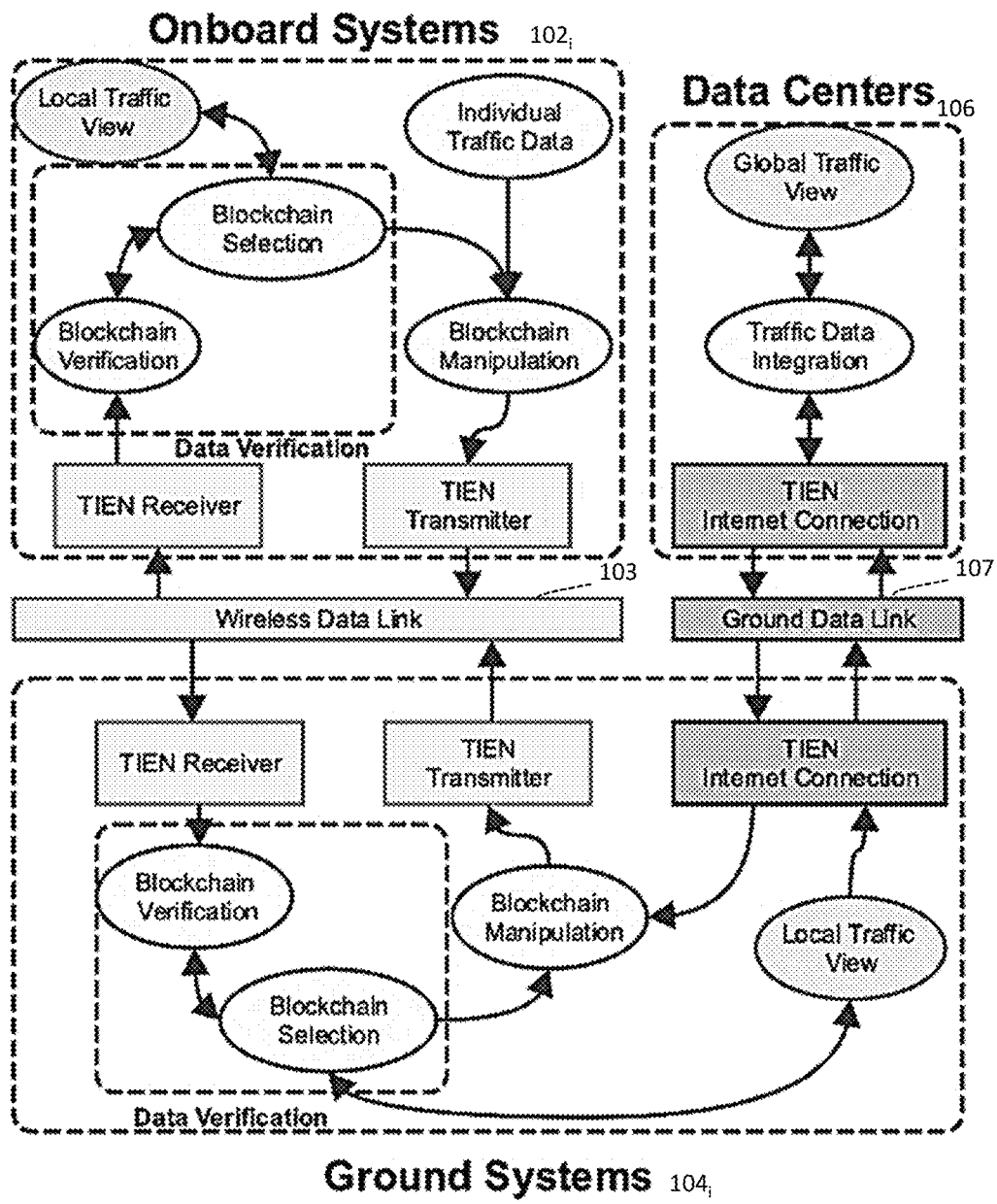
FIG. 5 is a detailed schematic of the blockchain communication methodology according to the present disclosure.

Referring to FIG. 5, a more detailed schematic of the blockchain communication methodology according to the present disclosure is provided. FIG. 5 is an information flow diagram that illustrates the processes of transmitting/receiving/verifying/validating traffic data. The boxes identified as TIEN Transmitter and TIEN Receiver represent interfaces to the wireless communication channel 103 (see FIGS. 1 and 2). The boxes identified as TIEN Internet Connection represent interfaces to the wired communication channel 107 (see FIGS. 1 and 2). The ovals in identified Local/Global Traffic View represent the outputs generate by the OBSs $102_i$, GSs $104_i$ and DCs 106.

The transmitted data through the wireless data channel 103 are in the format of blockchains, in which each block includes traffic data from different vehicles. By starting from the receiving process in OBSs $102_i$ in FIG. 5, an onboard system receives the traffic data in the format of a blockchain. Each block on the blockchain includes traffic data from different vehicles. Then, in the Blockchain Verification, the OBS $102_i$ verifies whether the received blockchain follows the predefined formats and whether the digital signatures within and between blocks match with each other. This process also collects all of the verified blockchain and generates a local traffic view, which includes the flying status and communication network topology of nearby traffics. In the Blockchain Selection process, the OBS $102_i$ conducts a Monte-Carlo Random Walk simulation to select one of the received blockchains, which matches well with the known local communication topology of the onboard system. With a new traffic data and the selected blockchain, the OBS $102_i$ creates a new block and append it on the blockchain in a predefined format in Blockchain Manipulation process. Thereafter, the blockchain is broadcasted out through the wireless data channel 103.

The GSs $104_i$ have the same procedures to manage blockchain data from the wireless data channel 103. In FIG. 5, a GS $104_i$ also has the capability to communicate with the DC 106 via the wired communication channel 107. The GS $104_i$ sends its local traffic view to the one or more DCs 106. Additionally, the GS $104_i$ receives data from the one or more DCs 106, appends the data on any selected blockchain, and broadcasts the blockchain out on the wireless communication channel 103. This mechanism enables a bi-directional communication between the OBSs $104_i$ and the DCs 106.

The DCs 106 are gates between the TIEN systems 100 to real world. A DC 106 shares information from the TIEN system 100 with subscribers and accept information from subscribers to the TIEN subsystem 100. It transforms local traffic views from ground systems to a global traffic view and shares with any subscriber. Since a DC 106 is aware of the communication topology of GSs $104_i$ and OBSs $102_i$, the DC 106 can evaluate the shortest paths to deliver information from the subscribers to certain vehicles.

In FIG. 5, the Blockchain Manipulation function appends new traffic data block on the selected blockchain. This function ensures the block header, one of the required data structures, is constructed properly based on the public and private data on the blockchain. The OBS $102_i$ periodically conduct these functions to broadcast the traffic data to others.

Figure 6:
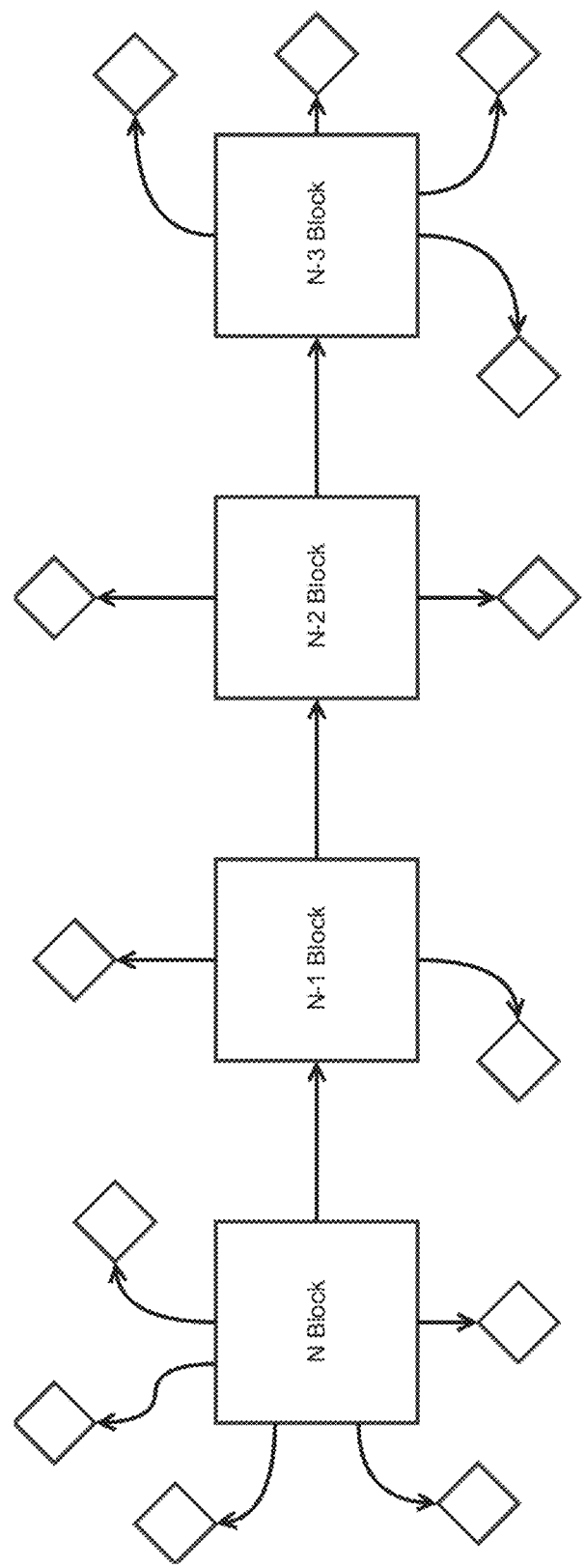
FIG. 6 is a schematic provided to visualize the blockchain structure.

The traffic data is transmitted in the form of blockchains to relay traffic data in a secured manner. Referring to FIG. 6, a schematic is provided to visualize the blockchain structure. The square blocks represent the blocks on a blockchain, while the diamonds represent the "neighboring" block signatures and the latest block signature on each blockchain.

Figure 7:
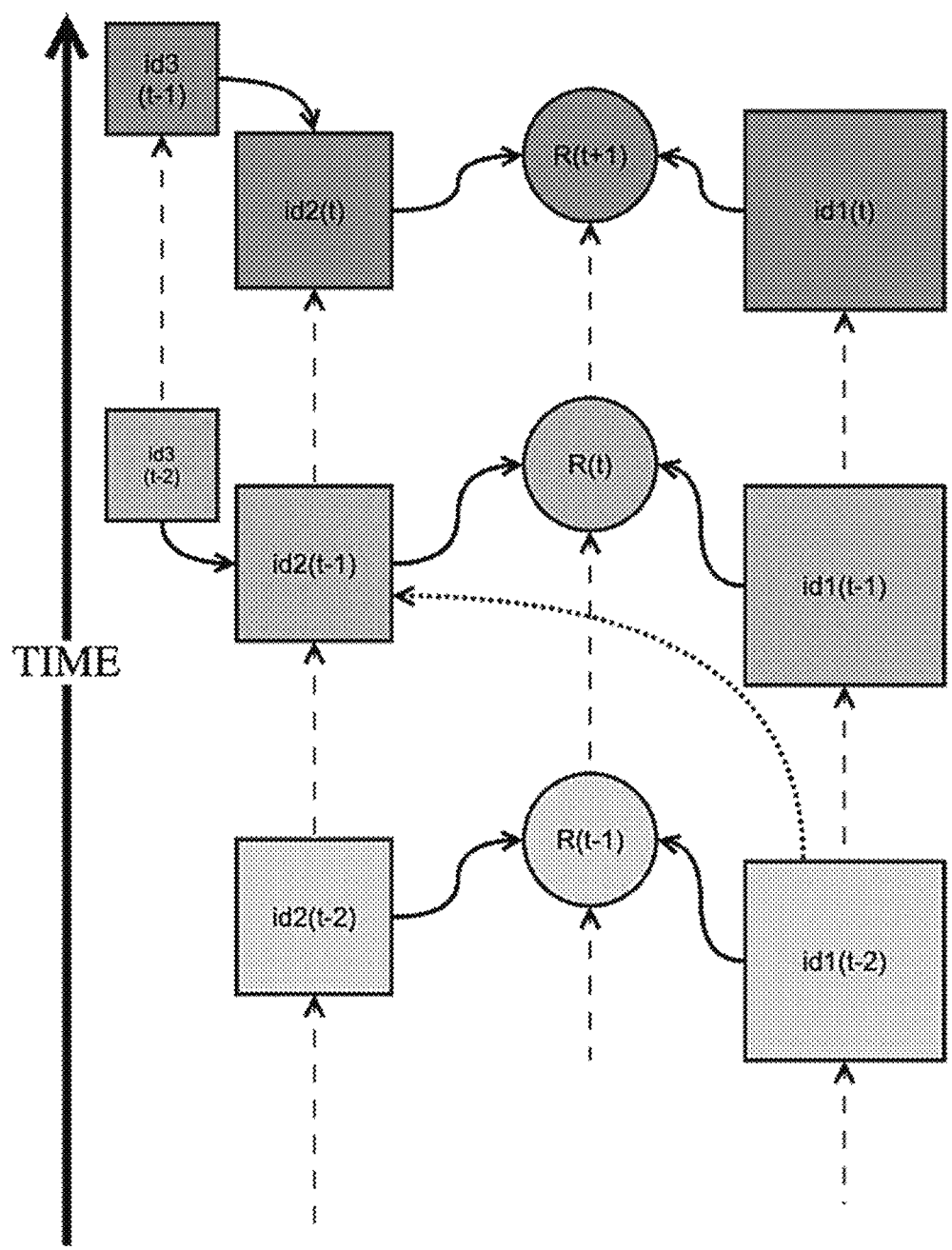
FIG. 7 is a schematic of local traffic view using a Directed Acyclic Graph (DAG), which includes both traffic history of neighboring moveable devices and the topology of the communication network.

A local traffic view is a special type of Directed Acyclic Graph (DAG), which includes both traffic history of neighboring UAVs and the topology of the communication network. FIG. 7 is a graphical chart for visualization of a local traffic view. In this graph, there are two types of blocks (square and round) and two types of links (dashed and solid) to connect the blocks. The circles represent receiver nodes, which will be created and connected with the blockchains that a receiver received from t−(n−1) to t−n. The square blocks represent the blocks on the received blockchains, which are generated and broadcasted by other TIEN devices. The dashed lines connect the blocks generated from the same TIEN device together, according to the block headers on each block. The solid lines represent the connections of blocks on the same blockchain. And, the dotted line shows the connection of a block from its "neighboring" block. Additionally, the blocks are shaded from a light shading gradient to a dark shading gradient according to the receiving time. The blocks with lighter color are older and, theoretically, less important to any collision avoidance algorithms and vehicle trajectory prediction algorithms.

A blockchain can be regarded as a piece of a puzzle for the DAG. The blockchain will connect to the DAG if any block signature from the blockchain matches with a block in the DAG. Blockchains will have more connections to the DAG if several "neighboring" TIEN devices are close to each other or blockchains include as many "neighboring" block signatures as possible.

When either an OBS $102_i$ or a GS $104i$ receives a blockchain, it must first verify the block. The authentication includes verifying the data authentication and authentication of the reported position. Generally, the verification includes the following steps:
1) Blockchain Verification;
2) Block Latency Verification; and
3) Reported Position Verification.

The received blockchain will be disregarded if it fails from any of the verification steps. Although the verification procedure greatly depends on the number of the neighboring block signatures in each block, the Data Transmission Mechanism discussed below describes how number of neighboring block signatures can help the propagation of a blockchain.

With respect to the blockchain verification, this step ensures the received blocks on a blockchain are valid. First, this step checks whether the data hash and data content match. Then, it verifies the block signature with the public key and the block header. Finally, it also verifies whether the blockchain has proper connections between each block. This mechanism can distinguish any manipulated block on a blockchain.

With respect to the blockchain latency verification, since the TIEN system 100 is a periodic broadcasting system, the time interval (based on the timestamps) between two connected blocks should be less than the broadcasting period. In this step, the devices in the TIEN system 100 find if, from the DAG, any "neighboring" block signature matches with the blocks from their local traffic views. Devices replace all of the "neighboring" block signatures with the real block. These blocks are called as neighboring blocks of the blockchain. Thereby, the TIEN system 100 devices check the time interval between the connected blocks.

Devices check the time interval between the receiving time and the last block's timestamp and this time interval should be less than the broadcasting interval. The devices then check whether the time intervals between two connected blocks on a received blockchain are less than the broadcasting period. This mechanism can determine whether the blockchain transmitter holds a blockchain for an unreasonably long time to thereby deduce the communication topology to inject fake vehicle information in the system.

With respect to reported position verification, this step verifies the authentication of the reported location in the last block from the received blockchain. The TIEN system 100 devices (i.e., the OBSs and GSs) have the capabilities to determine which devices are neighbors by simply receiving the wireless transmission from those neighboring devices. If the one OBS can receive shortrange wireless communication from another OBS or GS, then these devices are considered neighbors. Addition of neighbor authentication is an improvement over typical blockchain topologies whereby an intruder may be able to interfere (i.e., hack) with a network from a far distance (e.g., another location within a state, or another state or country), since being within the shortrange of wireless communication is a condition of authentication. For each block on a blockchain, the TIEN system 100 devices first authenticate the neighbors and then build a local traffic view based on that data.

Figure 8:
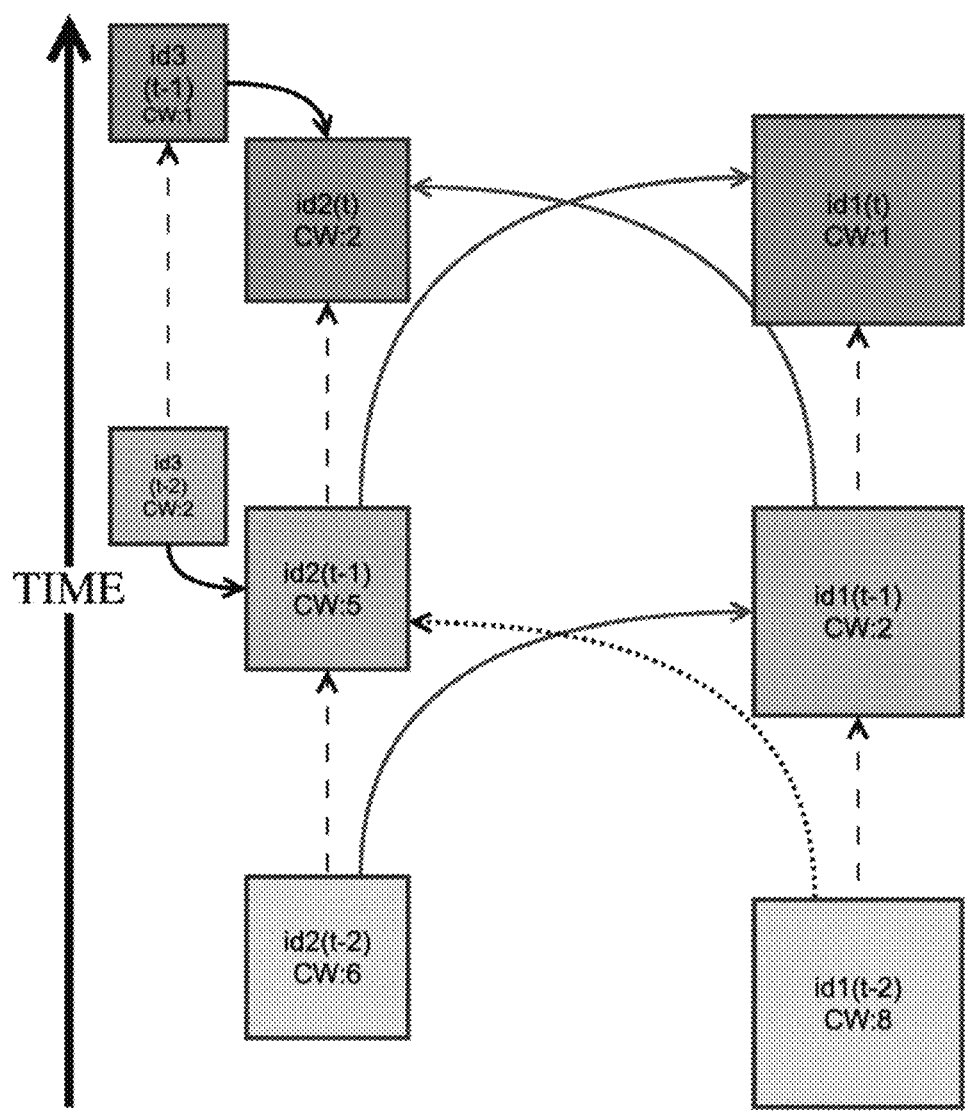
FIG. 8 is a schematic graph of a Monte Carlo Markov Chain (MCMC) random walk, used as part of blockchain selection, according to the present disclosure.

Prior to the TIEN system 100 devices select and broadcast their information, they integrate all of the received blockchains to their local traffic views. To select which one of the received blockchains to relay, the devices conduct a Monte Carlo Markov Chain (MCMC) random walk, known to a person having ordinary skill in the art. The first step of MCMC random walk converts a local traffic view into a walker map. Referring to FIG. 8, a schematic graph of a MCMC is shown. To convert a local traffic view to a walker map, a TIEN system 100 device first removes the receiver node from a local traffic view. Then, it connects first blockchain blocks received from t−(n−1) to t−n to the first blockchain blocks received from t−n to t−(n+1), as shown in solid lines in FIG. 8. In the second step, MCMC random walk algorithm calculates the cumulative weight (CW) of each block. Each block has its own weight equals to one. Then, cumulative weight of a block equals to the summation of the cumulative weights of its children block and its own weight. The solid arrow connections are excluded from the cumulative weight calculation. In the last step, the walkers are assigned to the blocks without any ancestor nodes based on the cumulative weights and start their journeys until they reach the last tail blocks. The blockchains with the most arrival walkers will be selected to relay the information. In reference to FIG. 8, two blockchains are shown. The block identified as id2($t$) has a CW of 2 (1 is for itself, and one from id3($t$−1), its only child). On the other hand, id1($t$) has no children, therefore its CW is 1. Next, id2($t$−1) has two children (i.e., id2($t$) with a CW of 2 and id3($t$−2) with a CW of 2, because its only child is id3($t$−1) with a CW of 1), resulting a CW of 5 for id2($t$−1). Next, id1($t$−1) has only one child, id1($t$) with a CW of 1, resulting in a CW of 2 for id1($t$−1). Next, id2($t$−2) has only one child, id2($t$−1) with a CW of 5, resulting in a CW of 6 for id2($t$−2). Finally, id1($t$−2) has two children, id2($t$−1) with a CW of 5 and id1($t$−1) with a CW of 2, resulting in a CW of 8 for id1($t$−2). In order to choose a blockchain, a stochastic process is desirable to pseudo randomly choose the next blockchain. Using these weights, a stochastically random walk is performed for the time t+1 as to which of the two blockchains should be chosen.

After the blockchain selection, the TIEN system 100 devices append a new block on the blockchain and broadcast out the blockchain. After the broadcasting phase, the TIEN system 100 devices will be ready to receive new blockchains. This procedure tends to transmit a blockchain with many neighboring block signatures. A blockchain with higher number of neighboring block signatures will increase the cumulative weights of its ancestors and have higher chance to be selected for the data transmission.

To guard against cyberattacks, the TIEN system 100 provides special provisions. These provisions are for two possible cyberattacks for the traffic data communication system, which are traffic data tampering attack and ghost vehicle injection attack. The traffic data tampering attack intends to tamper the traffic data from one or more vehicles and broadcast the fake information out. The ghost vehicle attack intends to create a non-existed vehicle in the local traffic views of other participants.

The traffic data tampering attack can be prevented due to the block signature. During the verification process, the TIEN system 100 devices check whether each block is signed by the correct participants. Since the public key corresponds to a specific participant, the attacker cannot tamper the traffic data if the digit signature algorithm is secure. The attacker cannot modify the transmitted traffic data to confuse other participants.

The second type of the cyber-attacks is the ghost vehicle injection. The attacker intends to create a fake traffic data about the status of a non-existed vehicle. The attacker follows the same digital signature algorithm to create a valid block signature with the non-existing vehicle status. A malicious participant needs to keep receiving and producing the data for a ghost vehicle to achieve this attack. The malicious participant needs to physically deploy and move a receiver around the path of the ghost vehicle. So, the malicious participant can build the local traffic view and collect the blockchains to broadcast the ghost traffic data. To encourage other participants to broadcast the ghost vehicle data, the data transmitter needs to be as close to the ghost vehicle as possible and attach as many "neighboring" block signatures. To ensure that the blockchain can pass through the blockchain verification steps, the fake location needs to be as close to the true location of the receiver as possible.

However, the malicious participant will become a valid participant if it tries to deploy a receiver and a transmitter to the locations of the ghost vehicle. Hence, the TIEN algorithm can prevent the ghost vehicle injection attack.

In order to show feasibility of the TIEN system 100, a simulations was carried out. The simulation was based on a Discrete Agent Framework (DAF) for agent-based modeling to investigate the TIEN system 100 performance with various operation environment in urban areas and TIEN system 100 setting. For the simulation simplicity, several assumptions related to city layouts, UAV operations, and the wireless data transmission were made. The goal of the simulation is to capture the realistic characteristics of the TIEN system 100 operation.

The virtual world of the simulation is a square with 2 km side length. There is a city with a square shape and side length 1 km locating at the center of the virtual world. In the city, there are sixty four building blocks evenly distributed and separated by roads. Each building block has a square shape with 100 m side length, while road width is 10 m. Each building block has 30% chance to have a building in it, which will block UAV flight paths and signal transmissions.

It is also assumed that UAVs fly in the same altitude and randomly enter from one side of virtual world to the opposite side. UAVs also find the shortest paths through the city with constant speeds. The simulation does not include any collision avoidance algorithm on UAVs because the goal of the simulation is to capture TIEN data transmission mechanism characteristics. UAVs keep their flight path and fly through each other if any collision happen. Finally, the flight starting time is randomly generated through the simulation.

Figure 9:
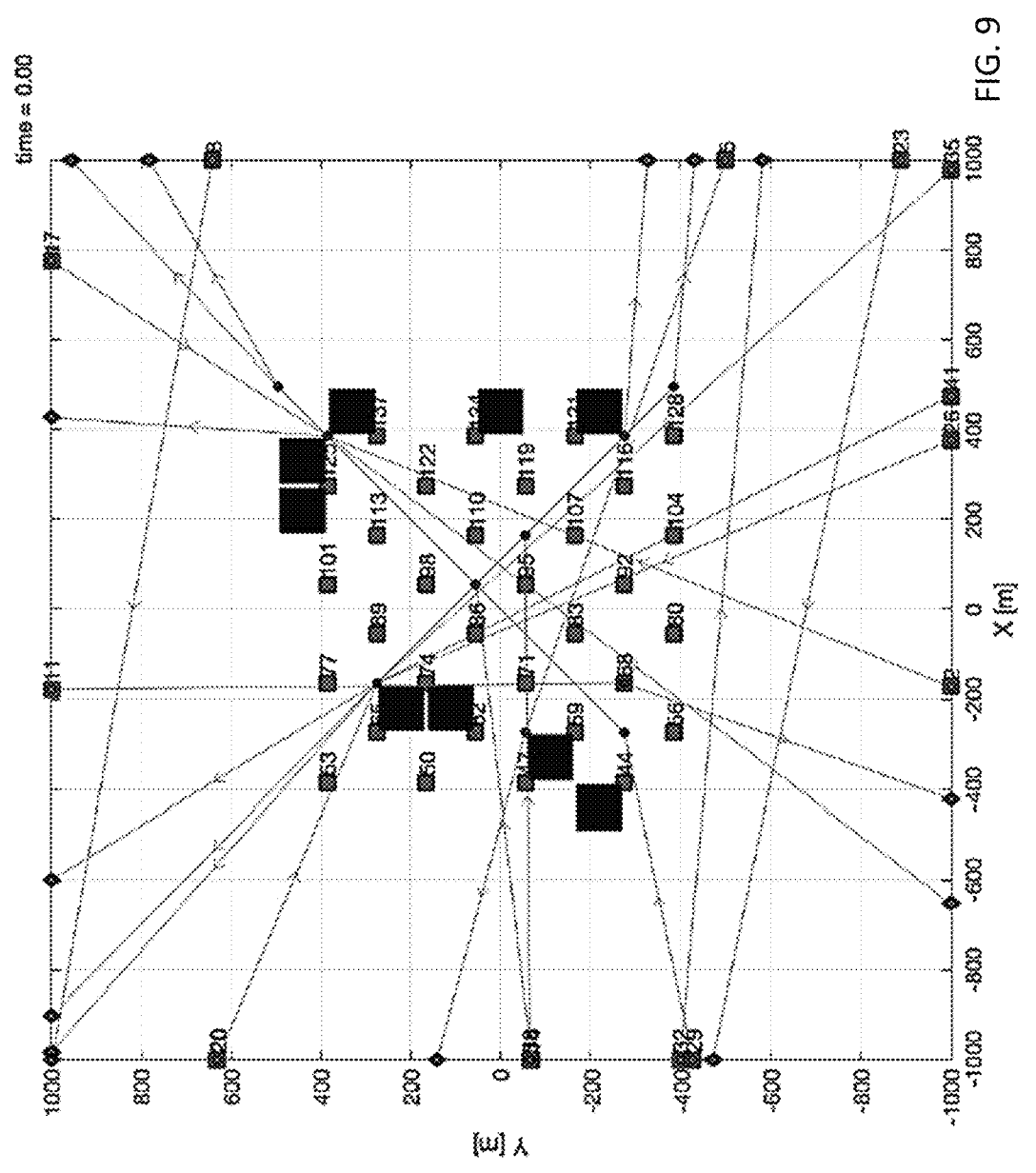

The TIEN system 100 uses short range high bandwidth communication channels for the data transmission. The transmission bit rate is 2 Mb/s, while the bit error rate is one by ten-thousands. The wireless communication is assumed to implement with forward bit correction scheme. By introducing the redundancy in the bits stream encoding, the system can recover the transmitted packet if there are less than 3 bits error per packet. The broadcasting range for both onboard and ground systems is 400 m. Finally, the authors assume that the transmission bit rate and bit error rate are constant regardless of the transmission environment. OBSs 102$_i$ are carried by UAVs, while GSs are evenly distributed in the city in predefined manners. Referring to FIG. 9, a schematic diagram of the layout of the virtual world for the simulation of the system 100 is provided. The small rectangle boxes represent UAVs and ground systems in the simulations, while the large rectangles represent the obstacles and block flight plan and data transmission between UAVs and ground systems.

The simulation focuses on the metrics to measure the performance of the TIEN system 100 which are missing UAV fraction ($\eta$) and effective broadcast range ($BR_{eff}$).

Missing UAV fraction is defined in Eq. (1). $N_{in}^i(t)$ represents number of onboard systems in the local traffic view of the OBS 102$_i$, while $N_{br}^i(t)$ is the number of OBSs within the broadcasting range of the OBS 102$_i$. $N(t)$ indicates number of operating onboard system at time t. The system level missing UAV fraction will be the average of missing UAV fraction across the simulation time, as shown in Eq. (2):

$$\eta(t) = \begin{cases} 0, & \text{if } N_{br}^i(t) = 0 \\ \frac{1}{N(t)} \sum_{i=1}^{N} \left(1 - \frac{N_{in}^i(t)}{N_{br}^i(t)}\right), & \text{otherwise} \end{cases} \quad (1)$$

$$\eta = \sum_{t=t_0}^{t_{end}} \frac{\eta(t)}{t_{end} - t_0} \quad (2)$$

Equation (3) shows the formulation of effective broadcast range. The effective broadcast range is the averaged longest distance between two onboard systems with the position error within the threshold.

$$BR_{eff} = \frac{1}{BR} \sum_{i=1}^{I} \sum_{t=t_0}^{t_{end}} \frac{\max_j \{d_{ij}(t) \times I_{\epsilon_{ij}(t) \leq \epsilon_{th}}\}}{(t_{end} - t_0)} \quad (3)$$

$$\text{where, } I_{\epsilon_{ij}(t) \leq \epsilon_{th}} = \begin{cases} 1, & \text{if } \epsilon_{ij}(t) \leq \epsilon_{th} \\ 0, & \text{otherwise} \end{cases} \quad (4)$$

$d_{ij}(t)$ is the relative distance between onboard systems i and j, while BR shows the signal broadcasting distance. $I_{\epsilon_{ij}(t) \leq \epsilon_{th}}$ is the indication function and shows the definition in Eq. (4). It would be one if the position error, $\epsilon_{ij}(t)$ of onboard system j in the local traffic view of onboard system i at time t is less than the position error threshold, $\epsilon_{th}$.

The results of the simulation show that all of the metrics (except effective broadcasting range) do not have significant correlations with the numbers of OBSs 102$_i$ in the simulations. Also, the effective broadcasting range can increase with the longer blockchain and higher setting for maximum blockchain length. To that end, $\mu_{UAV}$ represents the average time between two drones joining in the simulations, while MLB is the urn length of blockchain for the communication. $P_{obs}$ is the probability that a city block has an obstacle, while $GS_{str}$ corresponds to whether ground systems will be deployed or not in the city.

The results from a total of 1368 simulations (38 simulations for each combination of the stochastic variable values) were collected to better understand the properties of the framework of the system of the present disclosure.

Impact of the Maximum Length of the Blockchain (MLB)

Figure 10A:
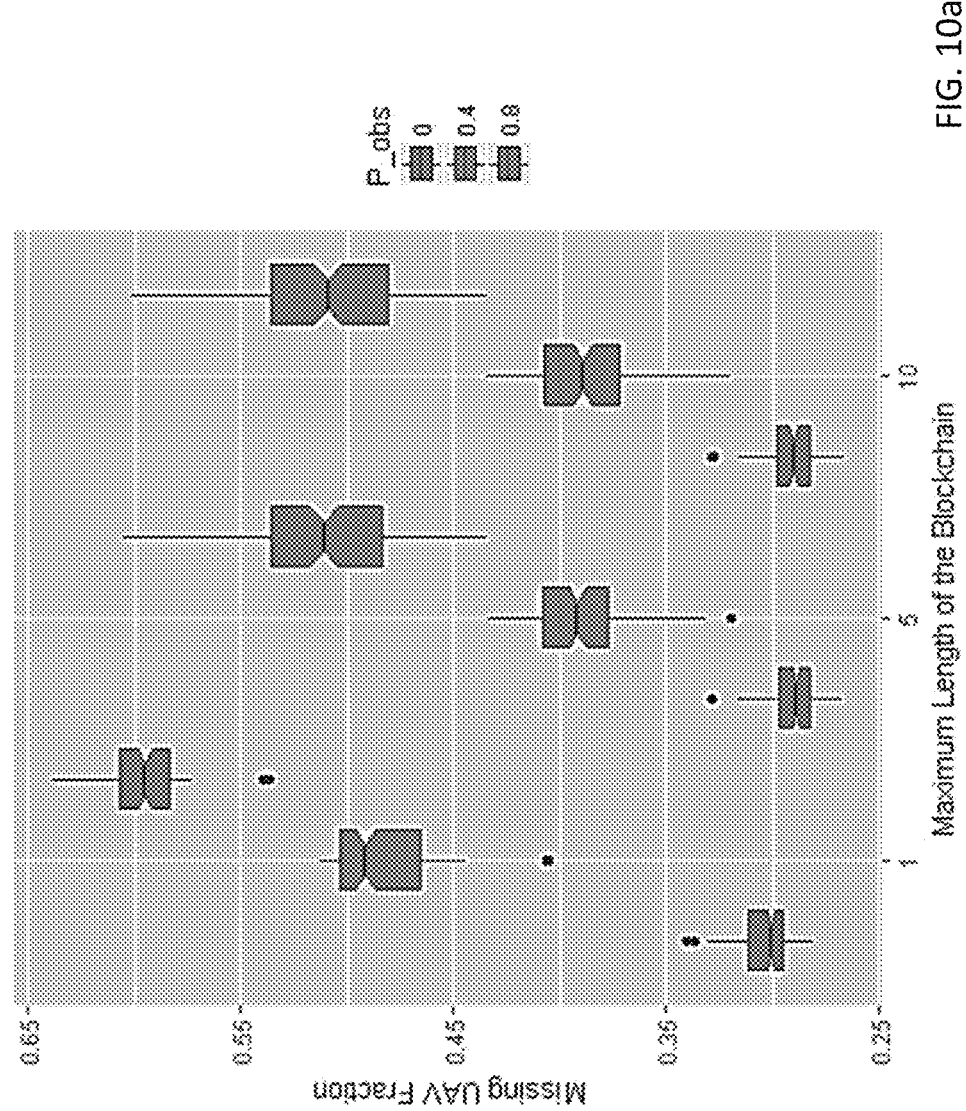
FIGS. 10a and 10b are graphs showing impact of maximum length of blockchain & obstacle density on system performance, according to the simulation of the system of the present disclosure.
Figure 10B:
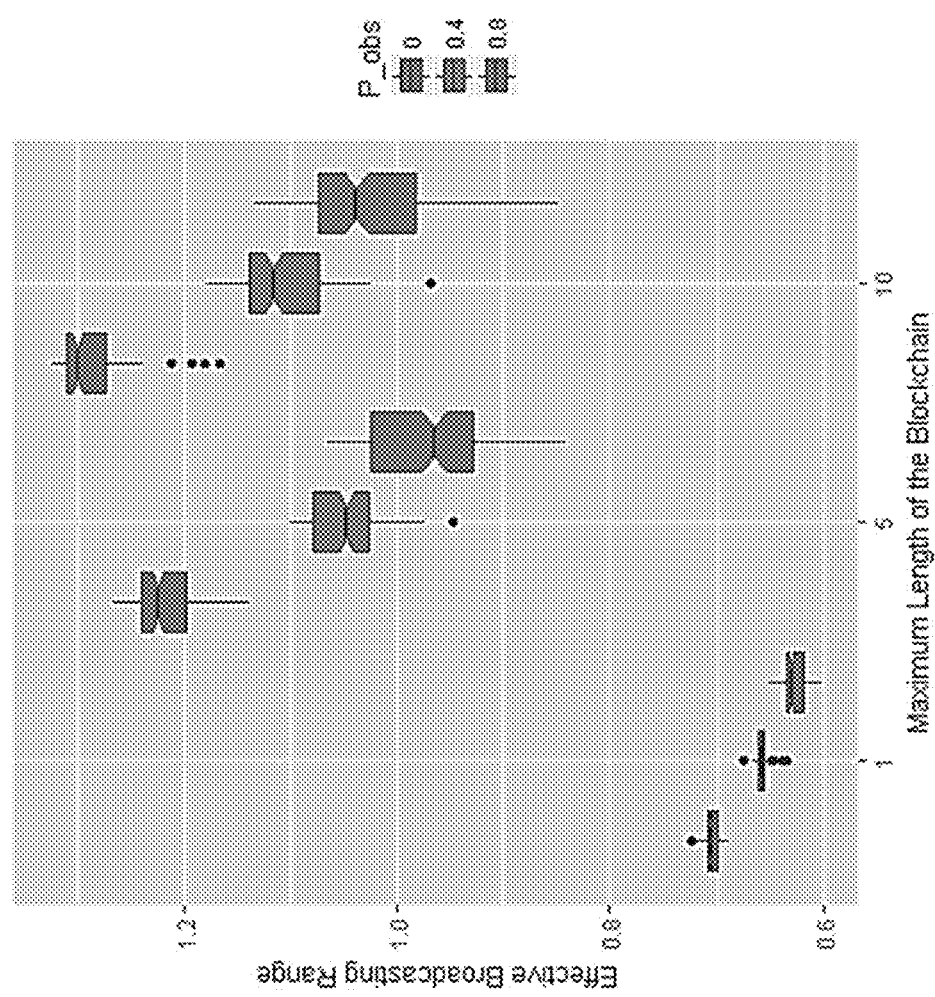

The case with MLB=1 corresponds to the current ADS-B system with a reduced broadcasting range of 400 m. This case serves as a basis to compare the impact of the proposed framework against an ADS-B-like system for UAS operations. Increasing the MLB leads to improvement in both the missing UAV fraction and effective broadcasting range. FIGS. 10a and 10b are graphs showing impact of MLB & obstacle density on system performance. Thus, these figures show the impact of MLB, coupled with the obstacle probability, on both performance metrics. With the help of the notched box plot, both MLB and obstacle probability has significant impact upon the performance. Key observation is that in case of the missing UAV fraction, increasing MLB yields diminishing returns for all obstacle probabilities. But for the effective broadcasting range, MLB has a substantial impact and the performance level, with obstacle probability as high as 0.8 and MLB=5, still has better performance than ADS-B-like system (MLB=1) in an open field with no obstacles (obstacle probability=0). This indicates that the TIEN system 100 significantly outperforms ADS-B-like system in an urban airspace that will potentially have large number of obstacles.

Figure 10C:
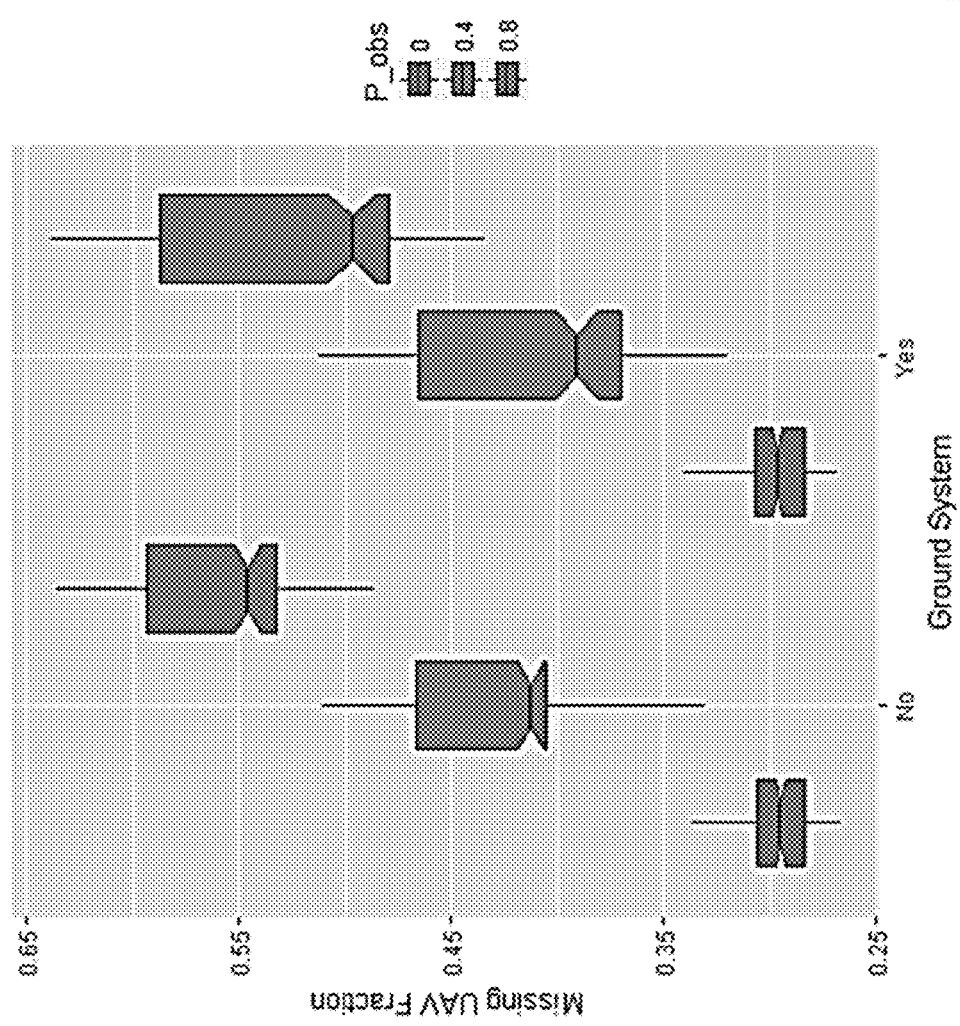
FIG. 10c is a graph that illustrates impact of the ground system, coupled with the duration between each UAV spawn (μUAV) on system performance.

FIG. 10c is another graph that illustrates the impact of the ground system, coupled with the duration between each UAV spawn ($\mu UAV$), on system performance. Higher the duration, lower the UAV density in the simulation. Key observation from the simulation data is that the introduction of ground system is only significant at lower UAV density. This makes sense as the ground system ensures that the system performance does not suffer due to lack of UAVs in the airspace. This property of the framework can prove crucial during the early adoption phase of the UAVs in the urban areas as it will ensure that the system performance doesn't fluctuate too much due to the varying density of UAVs in the airspace.

Figure 11:
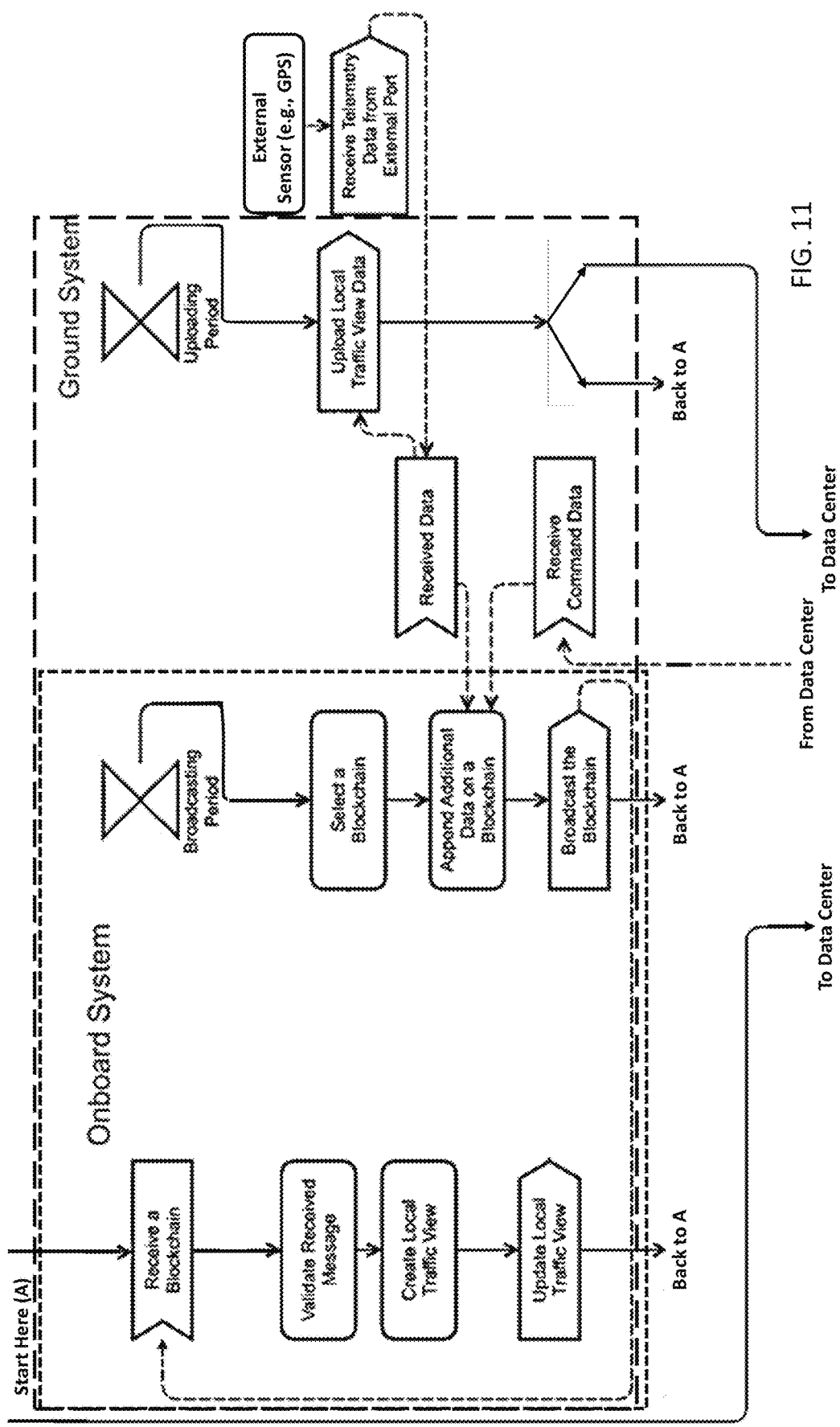
FIG. 11 provided over two pages, is another block diagram which shows a more detailed operational steps in the communication system and protocol of the system present disclosure.

Referring to FIG. 11 provided over two pages, is another block diagram which shows a more detailed operational steps in the communication system and protocol of the system of the present disclosure. In FIG. 11, an OBS, a GS, and a DC (data center) are shown. The outline of the OBS is shown in short dashed lines, while the outline of the GS is shown in long dashed lines. As discussed above, an OBS and GS operate similarly, except that a GS can also communicate with the DC. GSs can additionally, as shown in FIG. 11, communicate with external interfaces (e.g., receive telemetry data, weather data, position data, and data from a variety of external sensors, e.g., a GPS). An OBS/GS can progress down two paths: receiving a blockchain; or broadcasting a blockchain. As discussed above, when an OBS/GS receives a blockchain, it first validates the authenticity of all blocks on the blockchain. The verification process was discussed above with respect to FIG. 3c. Once the blockchain has been authenticated, the OBS/GS creates a local traffic view of all the neighboring OBSs/GSs. As discussed above, the local traffic view is generated based on the number of other OBSs/GSs that are within the wireless shortrange communication of an OBS/GS when those other OBSs/GSs communicate with the OBS/GS. The mere fact that an OBS/GS can receive shortrange wireless communication from other OBSs/GSs indicates those are neighboring devices. Thus anytime an OBS/GS comes into range and that OBS/GS places a new blockchain onto the wireless channel, all neighboring OBSs/GSs update their local traffic views with the newcomer's data.

On the other hand, the OBS/GS periodically broadcasts a blockchain. Since the amount of time dedicated to broadcasting a blockchain is much smaller than the period of time between each broadcast, stochastically the blocks have minimal probability of interference caused by simultaneous broadcasts. When the broadcasting period is upon the OBS/GS, it first has to select a blockchain. Different stochastic approaches can be applied for this selection process. Above, a Monte Carlo Markov Chain (MCMC) random walk, known to a person having ordinary skill in the art, was described. However, other stochastic approaches, known to a person having ordinary skill in the art are also available to select a blockchain by the OBS/GS. Once a blockchain has been selected, then new data including the updated local traffic view is appended to the blockchain and the blockchain is broadcasted.

In addition to the external sensors, GSs can also receive data from the data center (shown as "Receive Command Data") which is then added to the data to be appended onto the blockchain by the GS. Alternatively, the GS can communicate data (e.g., aggregated local traffic data from a plurality of OBSs) to the data center. The data centers in turn receives data from the GSs and provides that data to subscribers and authorized systems. Separately, the data centers can receive messages to be communicated to a particular OBS/GS from outside. When that happens, the data center first identifies the proper network routing and then send command data to the appropriate GS.

Those having ordinary skill in the art will recognize that numerous modifications can be made to the specific implementations described above. The implementations should not be limited to the particular limitations described. Other implementations may be possible.

The invention claimed is:

1. A blockchain-based distributed network, comprising:
a plurality of moveable devices coupled to each other by a shortrange wireless channel in a distributed network;
one or more ground systems coupled to the shortrange wireless channel in the distributed network; and
one or more data centers coupled to the one or more ground systems via a long-range channel;
each of the plurality of the moveable devices or the one or more ground systems including an onboard system adapted to i) receive one or more blockchains from the shortrange wireless channel; ii) verify authenticity of the one or more blockchains; iii) update data based on the verified one or more blockchains; iv) select one of the one or more blockchains; v) append a new block to last block of the selected blockchain, wherein the new block contains the updated data; and vi) broadcast the appended blockchain; and
the one or more ground systems adapted to relay information from and to the plurality of moveable devices to and from the one or more data centers.

2. The blockchain-based distributed network of claim 1, wherein each of the one or more blockchains is initiated by one of the plurality of moveable devices or by one of the one or more ground systems.

3. The blockchain-based distributed network of claim 2, wherein each block of the one or more blockchains includes i) a signature bitstream; ii) a selective public key; iii) a header; and iv) data each associated with the corresponding moveable device or the corresponding ground system.

4. The blockchain-based distributed network of claim 3, wherein the signature bitstream includes an encrypted header hash for the associated moveable device or the associated ground system utilizing a selective private key.

5. The blockchain-based distributed network of claim 4, wherein the encryption is performed by a digital signature algorithm.

6. The blockchain-based distributed network of claim 4, wherein the header includes i) a data hash obtained by applying a first hash function to data content of the associated moveable device or the associated ground system; ii) a block signature of a moveable device or a ground system representing last block placed on the blockchain; iii) a block signature from an immediately defined prior block corresponding to the associated moveable device or the associated ground system; and iv) block signatures of neighboring moveable devices and ground systems since last broadcast by the associated moveable device or the associated ground system.

7. The blockchain-based distributed network of claim 6, wherein the header hash is obtained by applying a second hash function to the header of the associated moveable device or the associated ground system.

8. The blockchain-based distributed network of claim 7, wherein the first hash function and the second hash function are the same.

9. The blockchain-based distributed network of claim 7, wherein the verification of authenticity of the blockchain includes i) decrypt the signature bitstream to yield a first copy of the header hash; ii) generate a second copy of the header hash by passing the header through the second hash function; and iii) verify the first copy of the header hash equals the second copy of the header hash.

10. The blockchain-based distributed network of claim 9, wherein the verification of authenticity of the blockchain further includes i) decode the header to yield a first copy of data hash; ii) generate a second copy of the data hash by passing the data through the first hash function; iii) verify the first copy of the data hash equals the second copy of the data hash.

11. The blockchain-based distributed network of claim 10, wherein the first hash function and the second hash function are the same.

12. The blockchain-based distributed network of claim 3, wherein the selection of one of the one or more blockchains includes establishing a time-based Directed Acyclic Graph for the one or more received blocks, with each block linked using the header and history of appended blocks in the received blockchains from the associated movable device or the associated ground system, wherein the history of appended blocks includes the headers of the appended blocks.

13. The blockchain-based distributed network of claim 12, with each ancestor block having a cumulative weight associated with its children, where each block adds one to the accumulative weight.

14. The blockchain-based distributed network of claim 13, wherein the selection of one of the one or more blockchains further includes a stochastic process.

15. The blockchain-based distributed network of claim 14, the stochastic process includes applying a pseudo-random selection process based on the accumulative weights.

16. The blockchain-based distributed network of claim 15, wherein the pseudo-random selection process is a Monte Carlo Markov Chain (MCMC) random walk.

17. The blockchain-based distributed network of claim 1, the updated data includes data associated with the corresponding moveable device or the corresponding ground system.

18. The blockchain-based distributed network of claim 17, the updated data includes updated local traffic associated with the corresponding moveable device or the corresponding ground system.

19. The blockchain-based distributed network of claim 1, wherein the one or more ground systems are stationary.

20. The blockchain-based distributed network of claim 1, wherein the one or more ground systems are moveable.

* * * * *